F. H. ROYCE.
EPICYCLIC GEARING.
APPLICATION FILED SEPT. 19, 1916.

1,225,360.

Patented May 8, 1917.
3 SHEETS—SHEET 2.

Inventor:
Frederick Henry Royce
by R. Haddan
his Attorney.

F. H. ROYCE.
EPICYCLIC GEARING.
APPLICATION FILED SEPT. 19, 1916.

1,225,360.

Patented May 8, 1917.
3 SHEETS—SHEET 3.

Inventor:
Frederick Henry Royce.
by R. H. Weldon
his Attorney.

UNITED STATES PATENT OFFICE.

FREDERICK HENRY ROYCE, OF DERBY, ENGLAND, ASSIGNOR TO ROLLS-ROYCE LIMITED, OF DERBY, ENGLAND.

EPICYCLIC GEARING.

1,225,360.　　　　Specification of Letters Patent.　　Patented May 8, 1917.

Application filed September 19, 1916.  Serial No. 121,070.

*To all whom it may concern:*

Be it known that I, FREDERICK HENRY ROYCE, a subject of the King of England, residing at Derby, in England, have invented certain new and useful Improvements in Epicyclic Gearing, of which the following is a specification.

This invention relates to epicyclic gearing and comprises improved means for mounting the main gear-shaft thereof in relation to a co-axial motive power shaft, more especially in the mounting of epicyclic reduction gear when interposed between the engines and the propellers of air-craft, and the object is to facilitate the erection and alinement of the gearing by the provision of a floating central or sun pinion anchorage and means for radially adjusting the end bearing of the main gear-shaft, said adjustment being provided to compensate for any adjustment made to or wear of the engine bearings.

In the accompanying drawings, which illustrate by way of example, the invention as applied to an aero-engine reduction gear:—

Throughout the views similar parts are marked with like reference characters.

Figure 1:
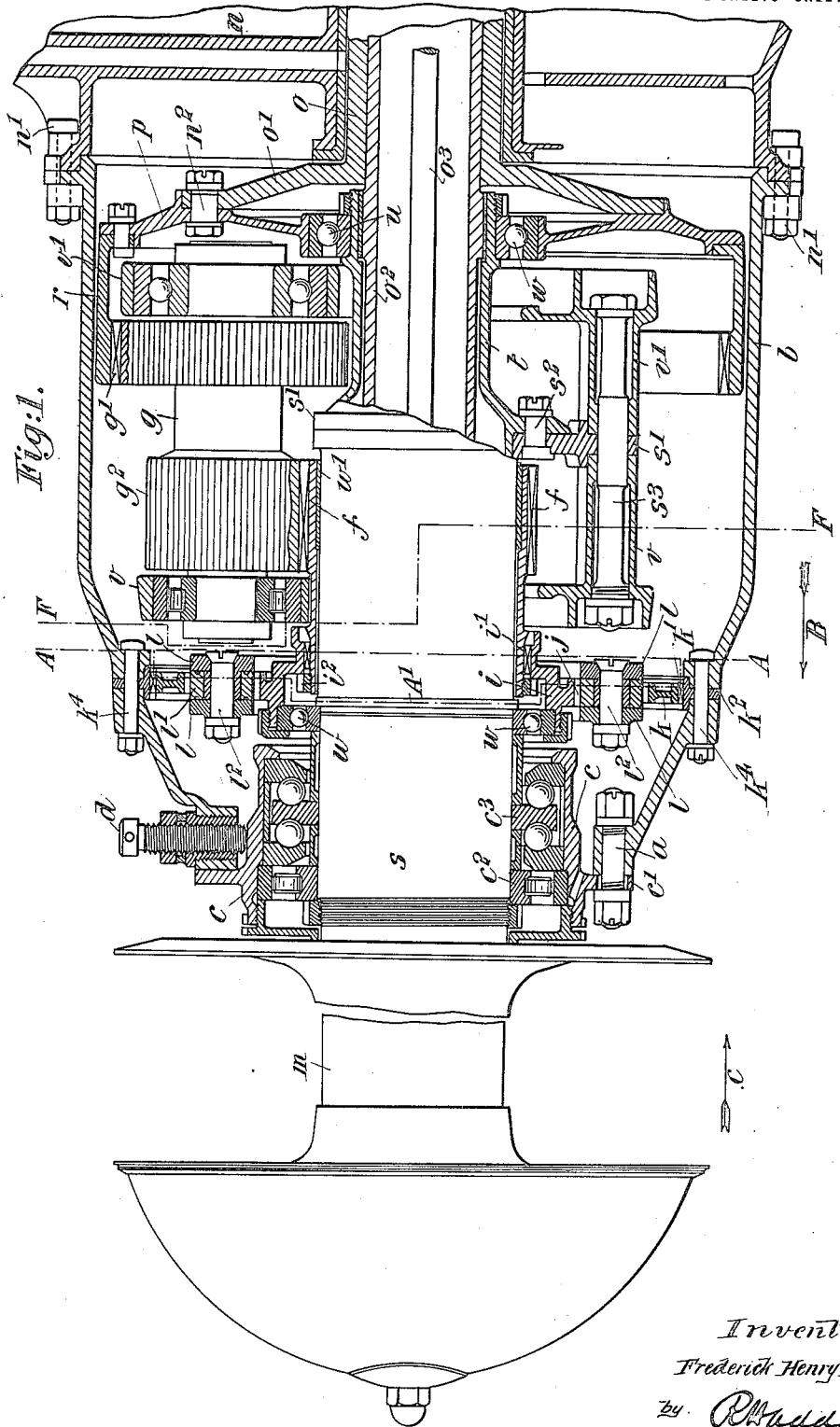
Figure 1 is a sectional side elevation of the gearing with the improvements applied thereto.
Figure 3:
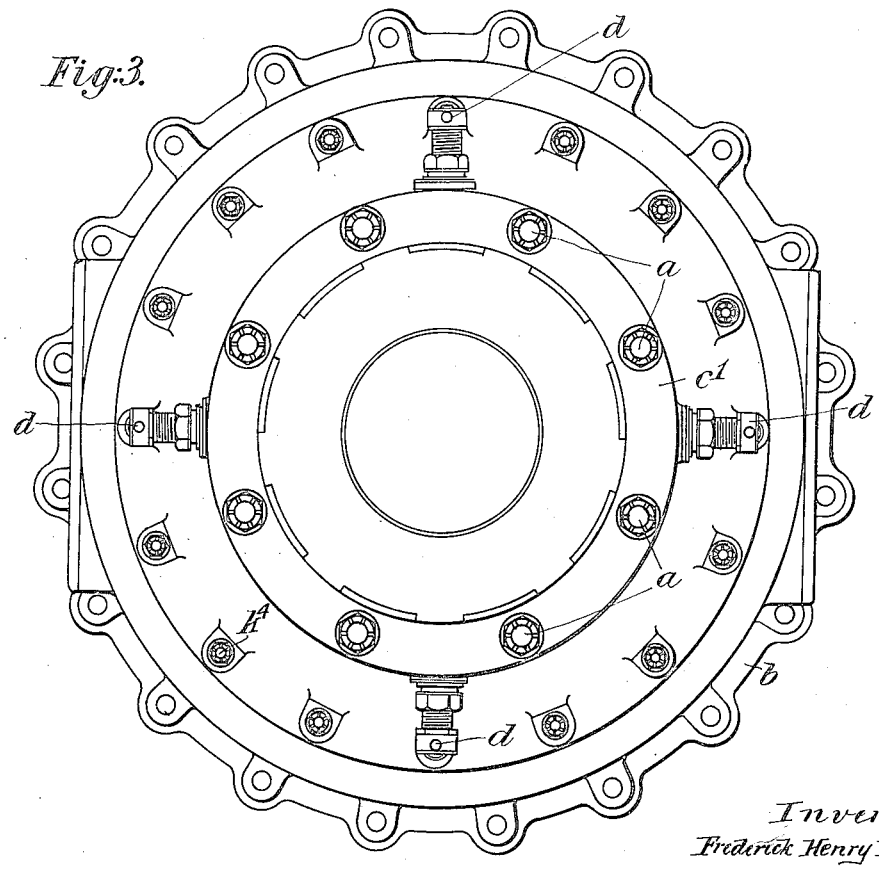
Fig. 3 is an end elevation looking in the direction of arrow C, the propeller hub being removed.
Figure 5:
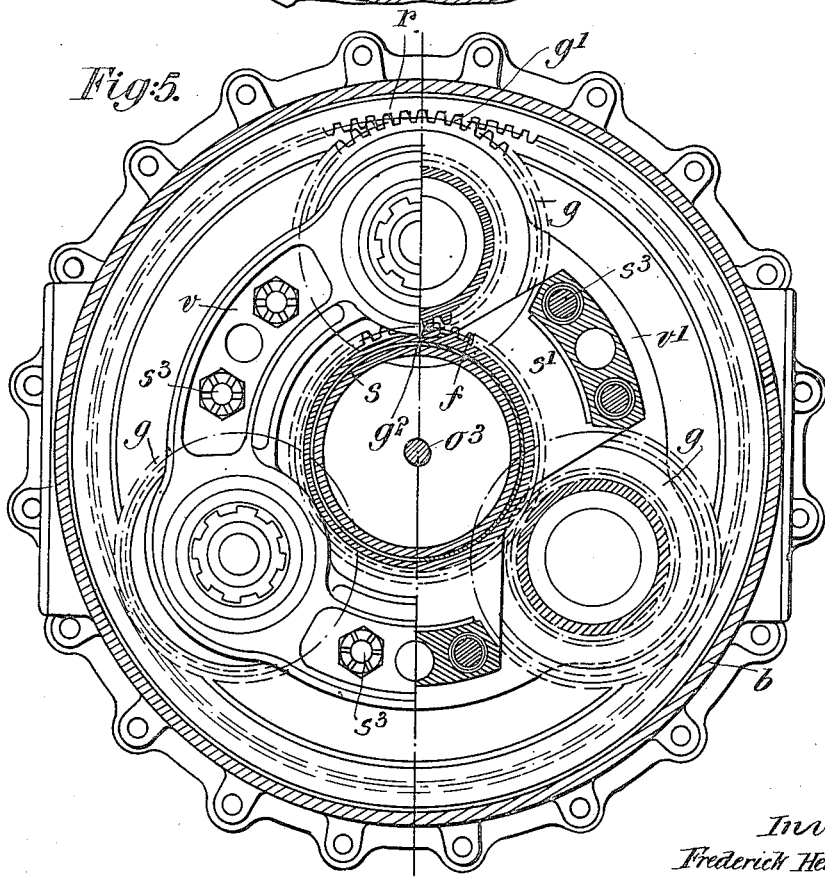
Fig. 5 is a cross section on the line F—F of Fig. 1 looking in the direction of arrow C.

The bolts $a$ which secure or couple the journal and thrust bearing housing $c$ to the end of the gear-casing $b$ are fitted into clearance holes through a flange $c^1$ of the housing $c$ to allow the latter to be radially adjusted in relation to the casing $b$ within certain limits, said adjustment being controlled by four radial set screws $d$ as shown in Figs. 1 and 3. During erection, or reërection after the engine bearings have been re-bedded down, the bolts $a$ are not screwed up tightly in the first place, but only sufficiently to hold the housing $c$ flatly against the facing of the gear-casing $b$, the screws $d$ being also left slack. The propeller (not shown) and propeller hub $m$ not being on the engine shaft, the propeller shaft $s$ and engine shaft $o$ are then rotated by hand, whereupon the housing $c$ will aline itself correctly. The coupling bolts $a$ may then be tightened up and the adjusting screws $d$ afterward screwed up to housing $c$ and locked in position. The gear-casing $b$ is secured to the engine crank case $n$ as by bolts $n^1$ and the crank shaft $o$ has formed at its extremity a flange $o^1$ to which is connected as by bolts $n^2$ a member $p$ carrying the internally toothed ring $r$. The hollow shaft $s$, on which is mounted the propeller hub $m$, has formed on its inner end a flange $s^1$ to which is attached as by bolts $s^2$ an extension $t$, the latter being fitted into the member $p$ by means of the ball bearing $u$. To the flange $s^1$ is also connected as by bolts $s^3$ the planet-cage which consists of two members $v$ and $v^1$, between which are arranged and spaced at equal intervals three double planet wheels $g$. The shape of said cage members $v$ and $v^1$ is clearly shown in Fig. 5. The teeth $g^1$ of larger diameter formed on the planet wheels $g$ mesh with the teeth of the ring $r$, while the teeth $g^2$ of smaller diameter mesh with the teeth of the sun-wheel $f$. This sun-wheel is rigidly secured to a carrier $i$ by means of castellations $i^1$ and nut $i^2$. The carrier is anchored to the gear casing $b$ in a manner to be described later, and is also supported on the shaft $s$ by a ball bearing $w$ and a plane bushing or bearing $w^1$. A hollow extension $o^2$ on the crank shaft $o$ is provided to facilitate the alinement and location of the gearing during erection. It is secured in position by means of the tension rod $o^3$. The housing $c$ previously mentioned contains a roller bearing $c^2$ and a double ball thrust bearing $c^3$.

Figure 2:
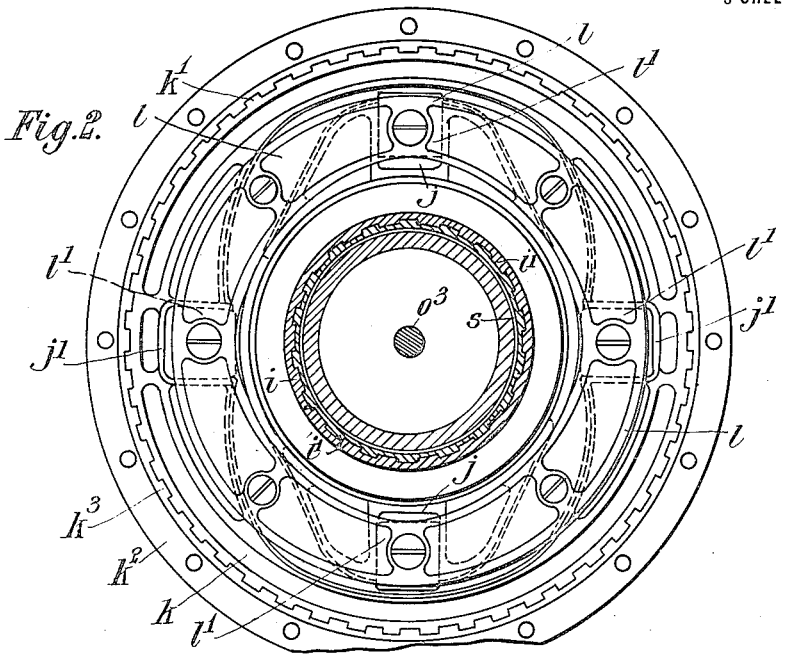
Fig. 2 is a cross section on the line A—A of Fig. 1 looking in the direction of arrow B.
Figure 4:
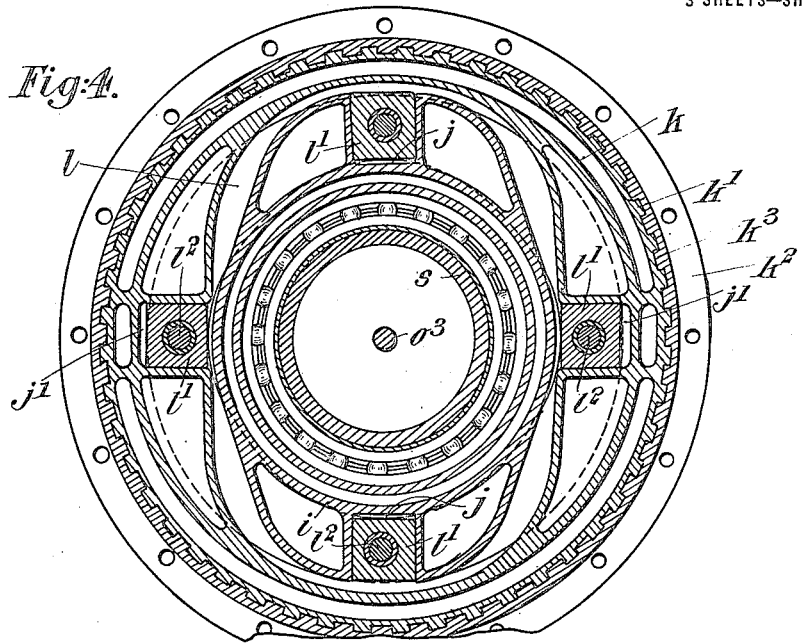
Fig. 4 is a cross section on the line A—A$^1$ of Fig. 1, looking in the direction of arrow B.

In order to preserve the sun-wheel $f$ in an exactly central position relatively to the planet wheels $g$ during the adjustment of the housing $c$ previously described, the sun-wheel is anchored to the gear-casing $b$ (which is as aforesaid bolted rigidly to the engine crank case $n$) by means of a special form of Oldham coupling, an end view of which is shown in broken lines in Fig. 2 and a similar view in section in Fig. 4. $f$ represents the sun-wheel proper and the carrier $i$ is attached to same as previously explained and is provided with two diametrically opposite recesses or forks $j$. An anchor-plate $k$ is provided with two or more similar recesses or slots $j^1$ at right angles to the recesses or forks $j$. The said anchor-plate $k$ has formed on its periphery castellations $k^1$ engaging with similar castellations $k^3$ formed on the inner edge of a ring $k^2$, which latter is attached to the gear box casing $b$ as shown by bolts $k^4$. The anchor-plate $k$ is thus prevented from rotating relatively to the gear casing but is not held thereby from movement in an axial direction. Floating or torque rings $l$ are provided attached together as by bolts $l^2$ and carry between them four hardened steel blocks $l^1$ equally spaced from each other, which blocks are positioned in the slots $j$ and $j^1$ of the carrier $i$ and anchor plate $k$ wherein they make a sliding fit. It will thus be seen that the sun-wheel $f$ being centered on the main shaft $s$ by the ball bearing $w$ which is housed in the sun-wheel-carrier $i$, and the bushing $w^1$, may yet move radially with the shafts $s$ and $o$ as the engine bearings wear or are re-bedded and the set screws $d$ are adjusted.

It should be observed that, theoretically, the bearings $w$ and $w^1$ are not necessary owing to the even circular distribution of the torque reaction transmitted to the sun-wheel by the three equally spaced planet wheels, $g$. In practice, however, owing to slight inaccuracies in machining and in distortion of gears etc. during hardening, it has been found advisable to assist the sun-wheel $f$ to preserve its concentricity by means of the bearings $w$ and $w^1$. In order that both the latter may be permitted to bed on the shaft, a small amount of clearance axially between the torque rings $l\ l$ and the anchor plate $k$, and also between the torque rings and the sun-wheel carrier $i$ is allowed.

What I claim as my invention and desire to secure by Letters Patent of the United States is:—

1. In an epicyclic gearing, the combination of a main gear shaft, a motive power shaft disposed co-axially therewith, a sun-wheel fixed on said gear shaft, planet wheels driven from the power shaft in mesh with said sun-wheel to drive the same, an annular gear encircling said planet wheels and in driving engagement therewith, means for driving said annular gear from said power shaft, a casing inclosing the gearing elements, an end bearing for the gear shaft, a housing for said bearing secured to the casing, and means for preventing relative rotation between said casing and sun-wheel while permitting limited radial and axial movements of the latter.

2. In an epicyclic gearing the combination of a main gear shaft, a motive power shaft disposed co-axially therewith, gearing elements comprising a sun-wheel on said gear shaft, and planet-wheels in mesh with said sun-wheel, means for driving said planet-wheels from said power shaft, a casing inclosing said gearing elements, an end-bearing for the gear shaft, means for adjusting said end bearing radially in relation to said power shaft, means for anchoring said sun-wheel against rotation in relation to the casing, and means for permitting limited radial and axial movements of said sun-wheel relatively to the gear casing.

3. In an epicyclic gearing, the combination of a main gear-shaft, a motive power shaft disposed co-axially therewith, gearing elements comprising a sun-wheel on the gear shaft and planet wheels in mesh with said sun-wheel, means for driving said planet wheels from said power shaft, a casing inclosing said gearing elements, a carrier for said sun-wheel having recesses, an anchor plate adjacent said sun-wheel-carrier also having recesses positioned angularly to those of the carrier, means for permitting axial movement of said anchor plate relatively to the casing, and floating rings having members adapted to slide in the recesses of the carrier and anchor plate to permit limited radial movement of the sun-wheel carrier.

4. In an epicyclic gearing, the combination of a main gear shaft, a power shaft disposed co-axially therewith, gearing elements comprising a sun-wheel on said gear-shaft and planet wheels in mesh with said sun-wheel, means for driving said planet wheels from said power shaft, a casing inclosing said gearing elements, means for anchoring the sun-wheel to the casing adapted also to permit alinement of the sun-wheel in an exactly central position in relation to the planet wheels, an end bearing for the gear shaft, and means for adjusting said end bearing radially in relation to the axis of the power shaft.

In witness whereof I have signed this specification in the presence of two witnesses.

FREDERICK HENRY ROYCE.

Witnesses:
 ALBERT GEORGE ELLIOTT,
 NORAH ISABEL WOLVERSON.